(12) United States Patent
Magnusson et al.

(10) Patent No.: US 10,240,605 B2
(45) Date of Patent: Mar. 26, 2019

(54) PUMP CONTROL UNIT LOCATED IN THE POWER CORD AND COMPATIBLE WITH MULTIPLE PUMP UNITS

(71) Applicant: Sulzer Pump Solutions AB, Malmö (SE)

(72) Inventors: Niklas Magnusson, Täby (SE); Nils Hökby, Saltsjöbaden (SE)

(73) Assignee: Sulzer Management AG, Winterthur (CH)

( * ) Notice: Subject to any disclaimer, the term of this patent is extended or adjusted under 35 U.S.C. 154(b) by 325 days.

(21) Appl. No.: 13/887,251

(22) Filed: May 3, 2013

(65) Prior Publication Data

US 2013/0294931 A1 Nov. 7, 2013

(30) Foreign Application Priority Data

May 4, 2012 (EP) ..................................... 12166848

(51) Int. Cl.
| | |
|---|---|
| *F04D 15/00* | (2006.01) |
| *F04D 15/02* | (2006.01) |
| *F04D 13/00* | (2006.01) |
| *F04D 13/06* | (2006.01) |
| *F04D 13/08* | (2006.01) |
| *H04B 3/54* | (2006.01) |

(52) U.S. Cl.
CPC ......... *F04D 15/00* (2013.01); *F04D 13/0693* (2013.01); *F04D 13/086* (2013.01);
(Continued)

(58) Field of Classification Search
CPC ........ F04B 49/00; F04B 49/06; F04B 49/065; F04B 13/0686; F04D 15/00;
(Continued)

(56) References Cited

U.S. PATENT DOCUMENTS 3,007,029 A * 10/1961 Levine .......................... 219/442
4,222,711 A * 9/1980 Mayer ..................... F04B 49/06
417/36

(Continued)

FOREIGN PATENT DOCUMENTS

| | | |
|---|---|---|
| JP | 2005171880 A | 6/2005 |
| WO | WO199708459 A1 | 3/1997 |

OTHER PUBLICATIONS

European Search Report dated Sep. 17, 2012 in European Application No. 12166848.7.

*Primary Examiner* — Bryan Lettman
*Assistant Examiner* — Timothy P Solak
(74) *Attorney, Agent, or Firm* — Kilpatrick Townsend & Stockton LLP

(57) ABSTRACT

Disclosed is a system for controlling a pump, such as a submersible pump intended for pumping water, including a pump and a separate electronic control unit connected to the pump by an electrical cable. The control unit is adapted to be detachably connected to the pump. The control unit is adapted to allow the pump's power supply to pass through the control unit. An electronic controller is arranged in the pump for controlling at least one of the pump's functions and/or monitoring at least one of the pump's operating conditions. The pump and the control unit are adapted to communicate with each other and transmitting signals, including necessary control and/or monitoring information/data, between each other.

14 Claims, 7 Drawing Sheets

(52) U.S. Cl.
CPC ..... *F04D 15/0027* (2013.01); *F04D 15/0066* (2013.01); *F04D 15/0088* (2013.01); *F04D 15/0218* (2013.01); *F04D 15/0245* (2013.01); *H04B 3/54* (2013.01)

(58) Field of Classification Search
CPC ............. F04D 15/0066; F04D 15/0077; F04D 15/0088; F04D 15/02; F04D 15/0218; F04D 15/0245; F04D 15/0254; F04D 15/0263; F04D 15/0272; F04D 13/0693; F04D 13/08; F04D 13/086; F04D 15/0027; F04D 13/0686
USPC ........................................................ 417/423.3
See application file for complete search history.

(56) References Cited

U.S. PATENT DOCUMENTS

| | | | | |
|---|---|---|---|---|
| 5,449,274 | A * | 9/1995 | Kochan, Jr. ........... | F04D 15/029 417/12 |
| 5,670,931 | A * | 9/1997 | Besser et al. ................. | 370/531 |
| 5,670,973 | A | 9/1997 | Bassett, Jr. et al. | |
| 6,167,965 | B1 * | 1/2001 | Bearden ................ | E21B 43/121 166/105.5 |
| 6,216,784 | B1 * | 4/2001 | Harrell ..................... | 166/250.15 |
| 7,184,258 | B2 * | 2/2007 | Lai ................. | 361/641 |
| 2005/0156050 | A1 * | 7/2005 | Shah et al. ..................... | 236/1 B |
| 2006/0078444 | A1 * | 4/2006 | Sacher .................. | F04B 49/065 417/423.3 |
| 2008/0031752 | A1 * | 2/2008 | Littwin ............... | F04D 15/0072 417/411 |
| 2009/0072958 | A1 * | 3/2009 | Hammerschmidt et al. ................ | 340/447 |
| 2009/0128068 | A1 * | 5/2009 | Mullin ................... | H02K 11/33 318/400.01 |
| 2010/0119365 | A1 * | 5/2010 | Andersson ..................... | 415/203 |
| 2011/0002791 | A1 * | 1/2011 | Meza ................ | F04D 15/0077 417/14 |
| 2011/0085916 | A1 * | 4/2011 | Talbot .................... | F04B 49/06 417/14 |
| 2011/0297391 | A1 * | 12/2011 | Fielder ................. | E21B 43/128 166/369 |
| 2012/0022645 | A1 * | 1/2012 | Burke .................... | A61M 1/1086 623/3.13 |
| 2012/0090331 | A1 * | 4/2012 | Bilton et al. .................... | 60/776 |

* cited by examiner

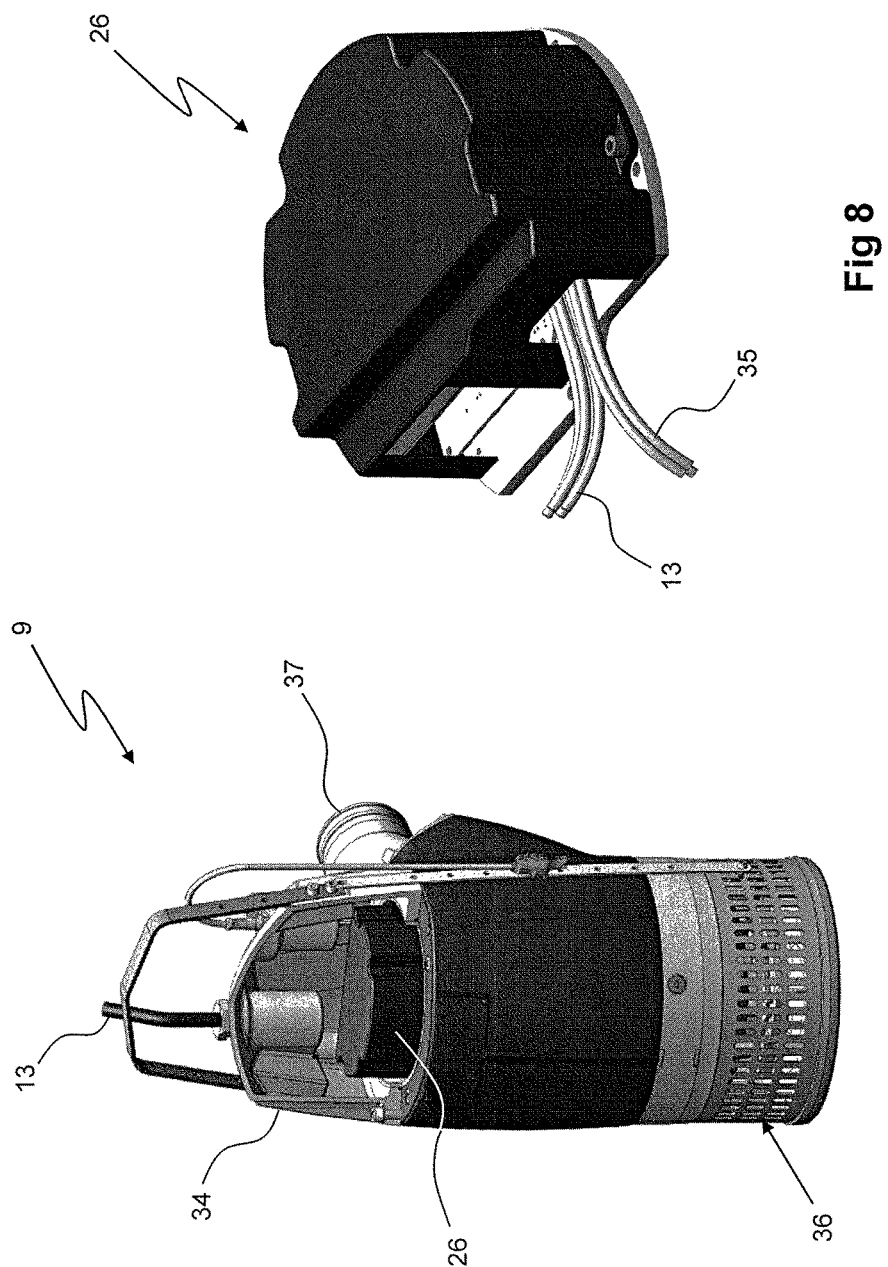

PUMP CONTROL UNIT LOCATED IN THE POWER CORD AND COMPATIBLE WITH MULTIPLE PUMP UNITS

This application claims priority to European Application No. 12166848.7 filed on May 4, 2012, the disclosure of which is incorporated by reference herein.

TECHNICAL FIELD

The present invention relates to a pump system, such as a submersible pump for example intended for pumping water. The present invention also relates to a pump and a separate control unit for use in the system.

BACKGROUND ART

Pumps are normally controlled by a conventional control cabinet or panel located between the power supply and the pump. Such conventional control panels are designed to be manually set to supply power with a specific current, phase direction, etc. suitable for a specific pump. This is a problem as the operator has to be careful to do and monitor these settings every time a new pump is installed. If the settings are incorrect the pump will not work properly or may be damaged. It is advantageous if the pump also could be automatically monitored with respect to different operations parameters such as temperature, overheating, low voltage, etc.

If for instance one phase is gone the pump may continue to pump, but will require more power/current and will get overheated by time. In order to monitor problems in the pump, for example overheating, the cables between the pump and the conventional control panel must be replaced with cables comprising additional electrical wires for the signal transmitting or separate signal cables have to be used for this purpose and connected between the pump and the control panel. Conventional control panels may also comprise a level sensing device for the water to be pumped and connected by a separate cable to the control panel.

Different control panels have to be used depending on the power rating of the pump and it is not possible to use the same identical control panel for all pumps. The specific control panel is therefore often attached or stored adjacent to its respective pump. This makes the equipment complicated to handle for the user and there is a need for improvements in the systems with pumps and control panels.

SUMMARY OF THE INVENTION

The object of the present invention is to provide a system for easy and flexible connection and controlling of a pump and where the above mentioned problems are solved or avoided.

This object is achieved by the present invention in that the system comprises a pump including an electronic controller and where the system also comprises a separate electronic control unit, connected and located along the power cable to the pump, i.e. between the power supply and the pump. The control unit is moreover adapted to be detachably connected to the pump, and adapted to allow the drive current to the pump to pass through the control unit or allow galvanic connection to the pump's power supply at power connection point. The electronic controller arranged within the pump is adapted to control at least one of the pump's operating functions and/or monitoring at least one of the pump's operating conditions. The pump and the control unit are also arranged to communicate with each other and to transmit signals carrying information, data and/or control commands necessary for the operation of the pump.

The control unit is provided with at least one operating switch for controlling at least one function of the pump as well as provided with a display for indicating of at least one operating condition of the pump and arranged to send or receive data from the pump and for transmitting control commands to the pump.

In addition, the object of the present invention is also achieved by a pump having an electrical motor and a mechanical pump wheel, comprising an inlet for incoming fluid and a discharge outlet for the outgoing fluid. An electronic controller is arranged in the pump for controlling at least one of the pump's functions and/or monitoring at least one of the pump's operating conditions. A Direct or Soft Starter Unit is arranged in the pump for starting the electrical motor to drive the pump wheel.

According to the present invention and said above system, the pump and the separate electronic control unit do not need to be switched in order to adapt to the power rating of the specific pump. The technical effect of this is that it is possible to use one and the same electronic control unit for all or most pumps, regardless of the power rating of the pump. The advantage of this is that it makes the pump and the electronic control unit considerably easier to handle.

When using the electronic control unit according to the invention, a conventional control panel is not needed.

Conventional control panels comprise all the software needed and the level sensing apparatus is connected separately to the control panel. According to the present invention some of the electronic logic and control functions are transferred from the control panel to the pump. The advantage of this is that the user does not need to make any software or level setting adjustments in a control panel. The pump and the control unit will pair automatically and the control unit will receive/transmit signals only to the paired pump.

Other objectives, embodiments and advantages of the present invention are described in closer detail in the description below and in the subsequent drawings and patent claims.

BRIEF DESCRIPTION OF THE DRAWINGS

The present invention will now be described in detail according to embodiments of the present invention with reference to the figures, wherein:

FIG. 7 shows a pump according to the invention, including an electronic controller; and FIG. 8 shows the electronic controller in the pump comprising all electronics necessary for operating the electrical motor to drive the pump wheel, such as for example starting equipment and/or electronics for monitoring at least one of the pump's operating conditions.

DETAILED DESCRIPTION

The present invention relates to a system for using and controlling a pump, such as a submersible pump, for example intended for pumping water. The present invention also relates to a pump and an electronic control unit for use in the system according to the invention.

Figure 1:
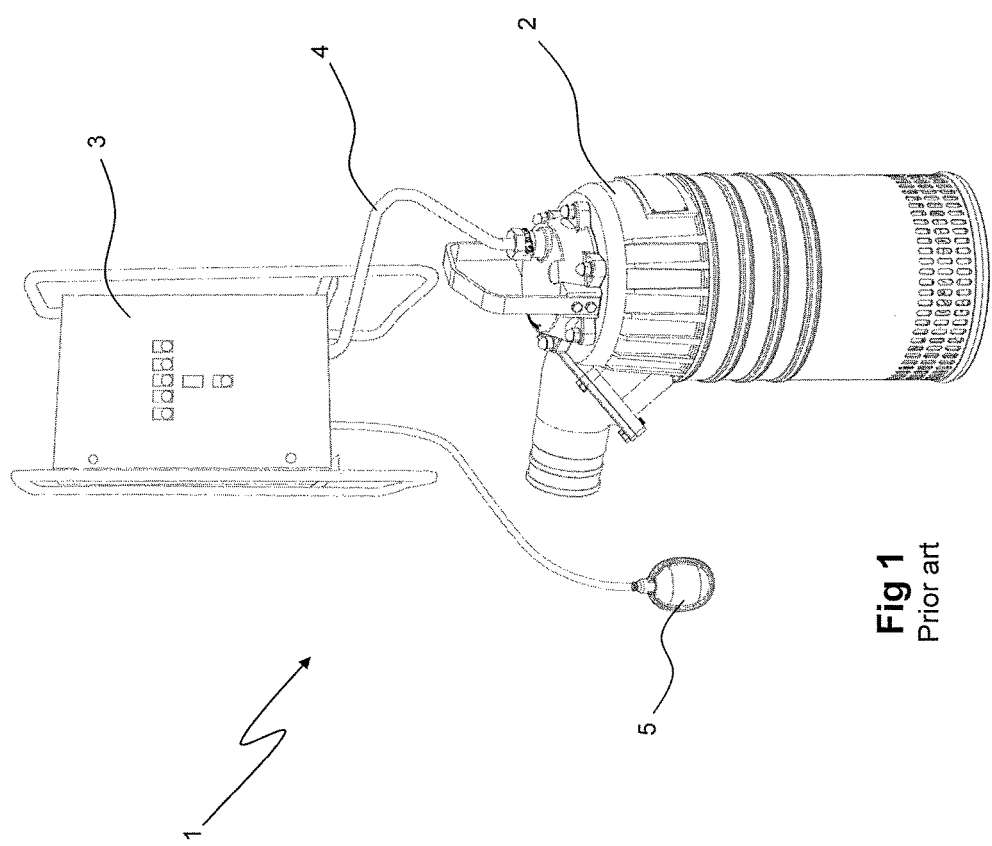
FIG. 1 shows a conventional control panel connected to a pump according to prior art.

FIG. 1 shows prior art, a conventional pump system 1 including a pump 2 and its control equipment. The control equipment comprises a conventional control panel 3 connected to the pump 2 via an electrical power cable 4 and the control panel 3 includes all necessary electronics and electrical equipment for controlling the pump 2 such as starting equipment/electronics and electronics for monitoring the operating conditions of the pump 2. The control panel 3 is in turn connected to a power supply (not shown). This type of control equipment must be manually and individually adjusted to the specifications for each new connected pump and be adapted to the size of the pump, i.e. to the pump's current consumption. Therefore the user/operator of the pump system has to make individual settings in the control panel/equipment each time a pump is connected. This is associated with several drawbacks such as it takes time to make appropriate settings, the operator/user needs to have knowledge of the settings as if the settings are done incorrectly the pump may be damaged or will operate ineffectively. A water level sensor 5 can also be connected to the control panel 3 which is shown in FIG. 1.

Figure 2:
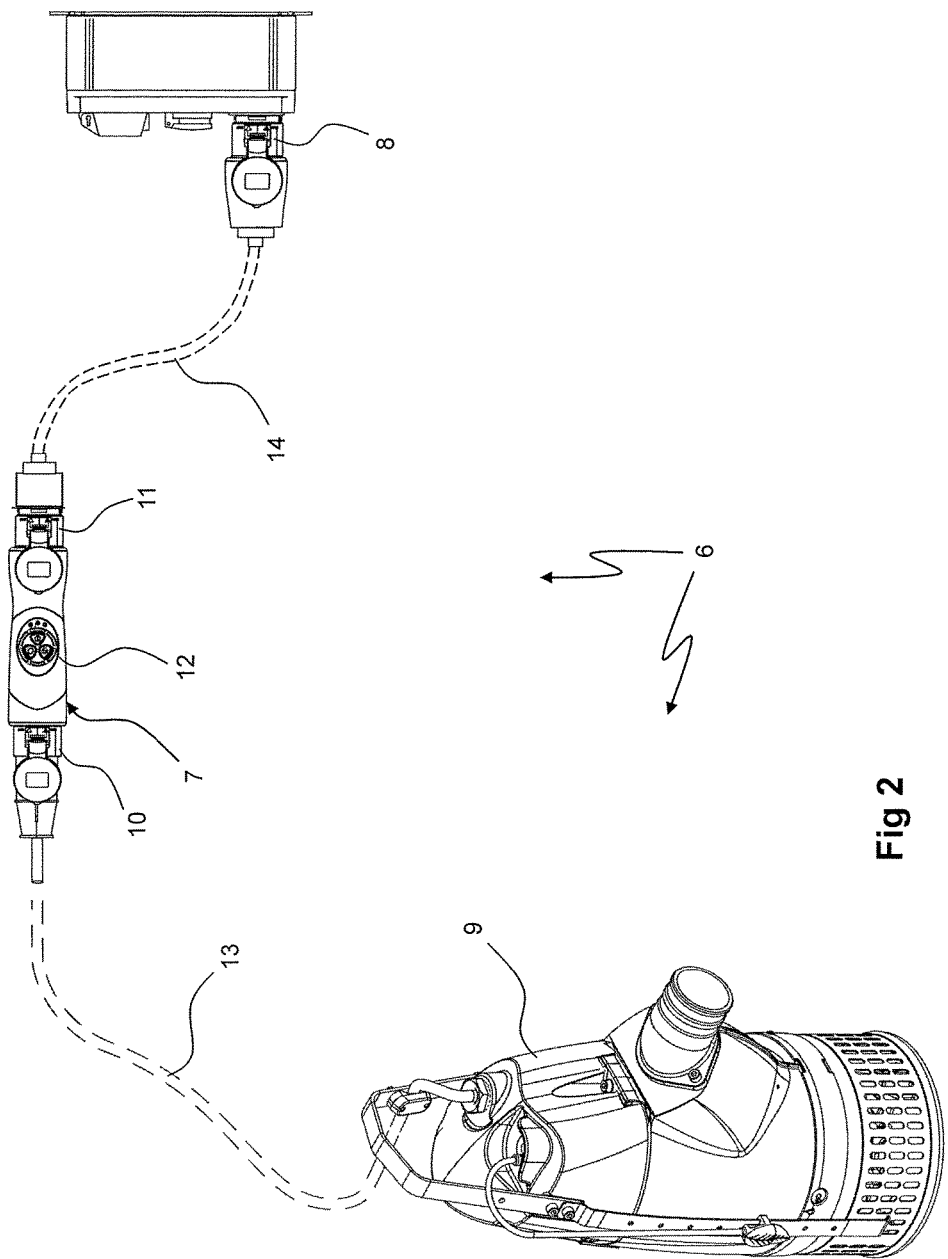
FIG. 2 shows a system according to the present invention, including an electronic control unit connected along the power cable to a pump

FIG. 2 shows a pump system 6 according to the invention. An electronic control unit 7 is connected between a power supply outlet 8 and the pump 9. The electronic control unit 7 has an elongated design with an electrical plug connector 10, 11 located in each end. The electronic control unit 7 is also equipped with an operating panel 12 including operating switches for manual operation and controlling of the pump as well as with a display with indicators for showing the current operating conditions of the pump 9. The electronic control unit 7 is connected to the pump 9 by a three phase power cable 13 and connected to the power supply outlet 8 via a further three phase power cable 14. It is possible to use the same electrical plugs and cables for many different pumps, regardless of the power consumption of the pump.

Figure 3:
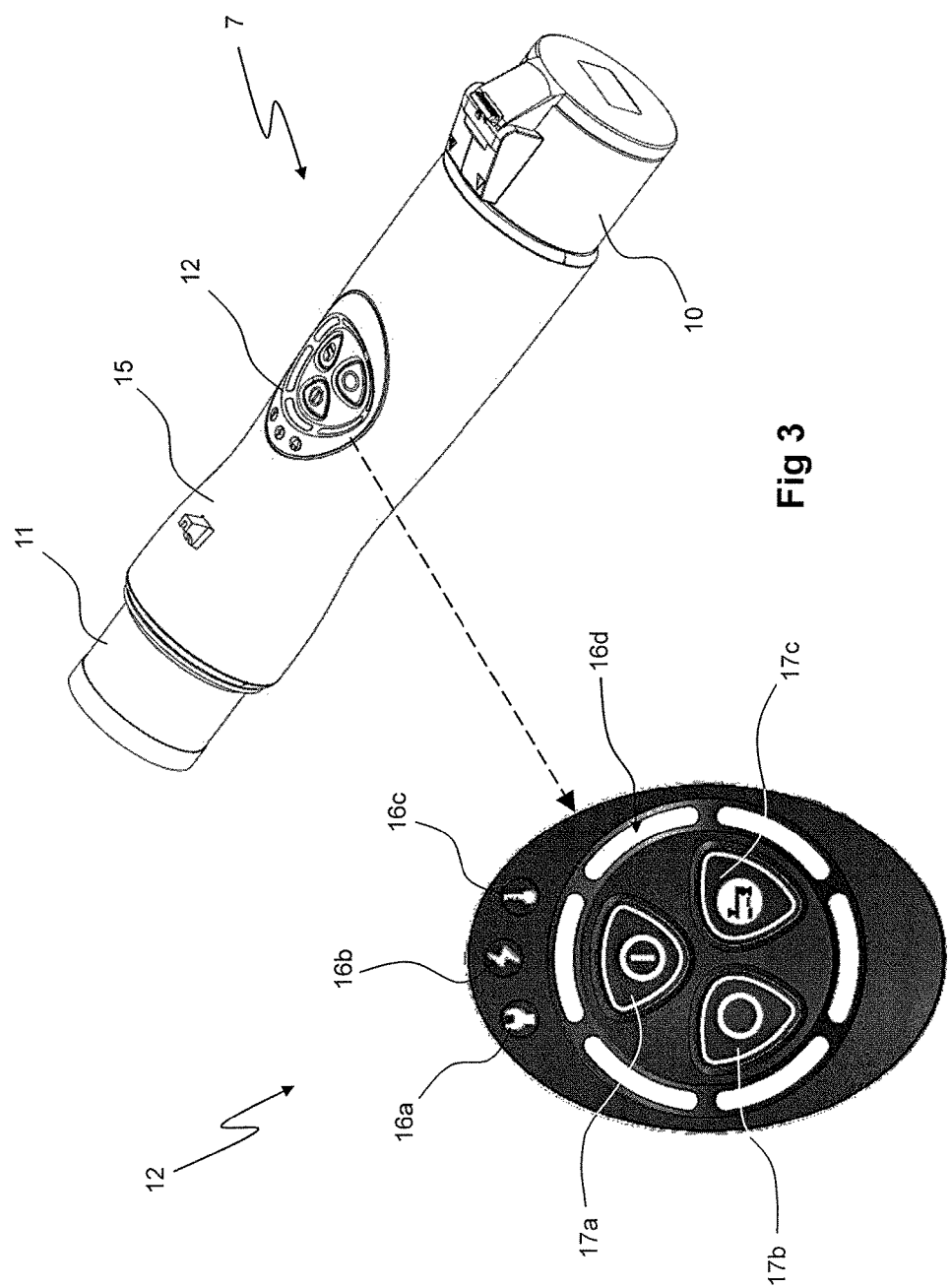
FIG. 3 shows an electronic control unit according to the present invention in more detail and where the design of the display and actuating means are illustrated enlarged.

FIG. 3 shows the electronic control unit 7 in more detail. The housing 15 of the electronic control unit 7 is a longitudinal extending body made of a plastic material such as PA6-6 (Polyamide also known as Nylon) and it also comprises the operating panel 12 with its indicating and actuating means.

A first electric power connector (female) 10 is arranged in one end of the housing 15 and intended for electrical connection of a pump 9, via a first three phase power cable 13. A second electric power connector (male) 11 is attached to the housing 15 at its other end which is adapted for electrical connection to a power supply 8.

In the same figure, and to the lower left, the operating panel 12 with its indicating and actuating means is further enlarged to illustrate the individual indicating means and actuating means in more detail. The operating panel comprises light emitting diodes 16a-c that indicate alarms and warnings regarding the condition of the pump 9. A first indicating means, a light emitting diode 16a, for example, indicates if the pump needs service due to water in oil. Oil is present between the two mechanical seals that seal the motor shaft and could be leaking. The insulation of the pump 9 could also be a problem due to leaks of water into the electrical motor. The second indicating means or diode 16b indicates if the pump is cut out due to power failure, e.g., if a phase is missing or if the phases are largely unbalanced. The third indicating means or diode 16c indicates if the pump is cut out due to high temperature in the motor or in the starter unit. An alarm or a warning is indicated when the diode is flashing or lighting constantly.

The user may also manually control the pump 9 by using the actuating means 17a-c. The first actuating means 17a is used to stop the pump and the button lights up when the pump is stopped. The second actuating means 17b is used to put the pump in continuous running mode, which is the standard start mode. The button lights up when the pump is running. The third actuating means 17c is pressed for Energy save mode and lights up when the Energy save mode is on.

A ring of indicating means 16d shows the status of the pump, such as green light when the pump is running, red light when pump is stopped manually, flashing red light when the pump is stopped due to an alarm and blue light when the pump is working in the Energy save mode.

Figure 4:
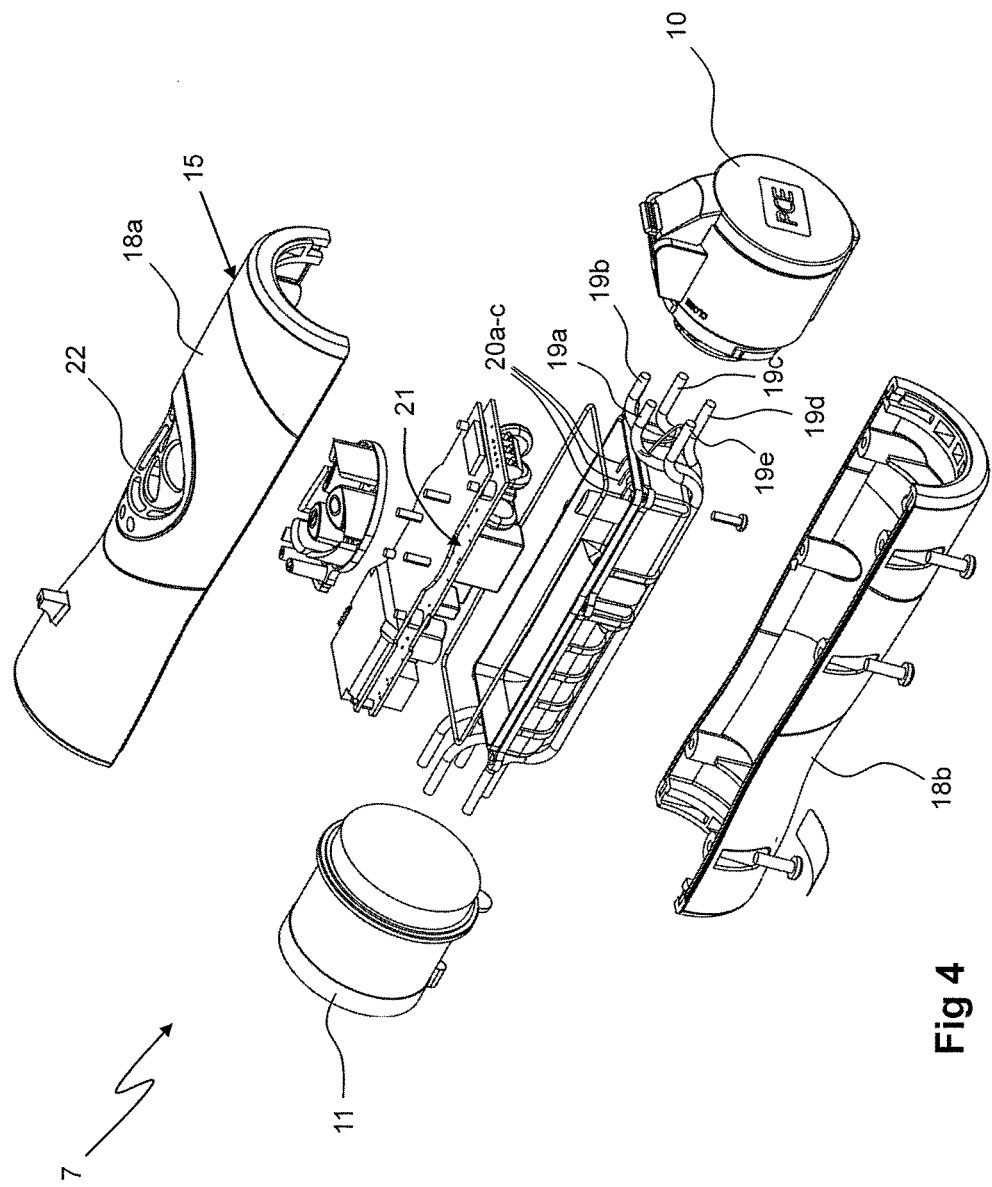
FIG. 4 shows the electronic control unit according to the present invention in an exploded view.

FIG. 4 shows the electronic control unit 7 according to the present invention, in an exploded view. The electronic control unit 7 comprises a housing 15 having at one end area a first electric power connector (female) 10 arranged for electrical connection of a pump 9, via a first three phase power cable 13. A second electric power connector (male) 11 is attached to the housing 15 at its other end which is adapted for electrical connection to a power supply outlet 8 via a second three phase power cable 14. The housing 15 comprises two shells 18a,b, that are demountable from each other. The housing 15 further comprises a recess 22 for an operating panel 12, located on one side of the house 15, including indicating and actuating means. Within the housing 15 three phase conductors 19a-c are arranged as well as a ground conductor 19d and a neutral conductor 19e running from the first connector 11 through the housing 15 to the second connector 10, essentially in the longitudinal direction of the housing 15. Two or more electrical conductors 20a-c are galvanically connected to the three phase conductors 19a-c at one end and at the other end connected to a circuit board 21 arranged within the housing 15. The operating panel 12 is inserted and installed in the recess 22 in the housing 15, such that the front of the operating panel 12 is facing the outer surrounding of the housing 15. The operating panel 12 and its indicating and actuating means are connected to the internal circuit board 21 so command signals could be generated in the circuit board 21 and transferred via the three phase power cable 13 to the pump 9. The operation of the pump 9 could in this way be controlled and data/information from the pump 9 could be transferred back to the electronic control unit 7 and the operating conditions of the pump 9 may in this way be monitored and indicated to the operator via the indicating means, and controlled by activating the operating means. The circuit board 21 is supported within the housing 15 by supporting structures and sealed from the surroundings in order to be waterproof.

Figure 5:
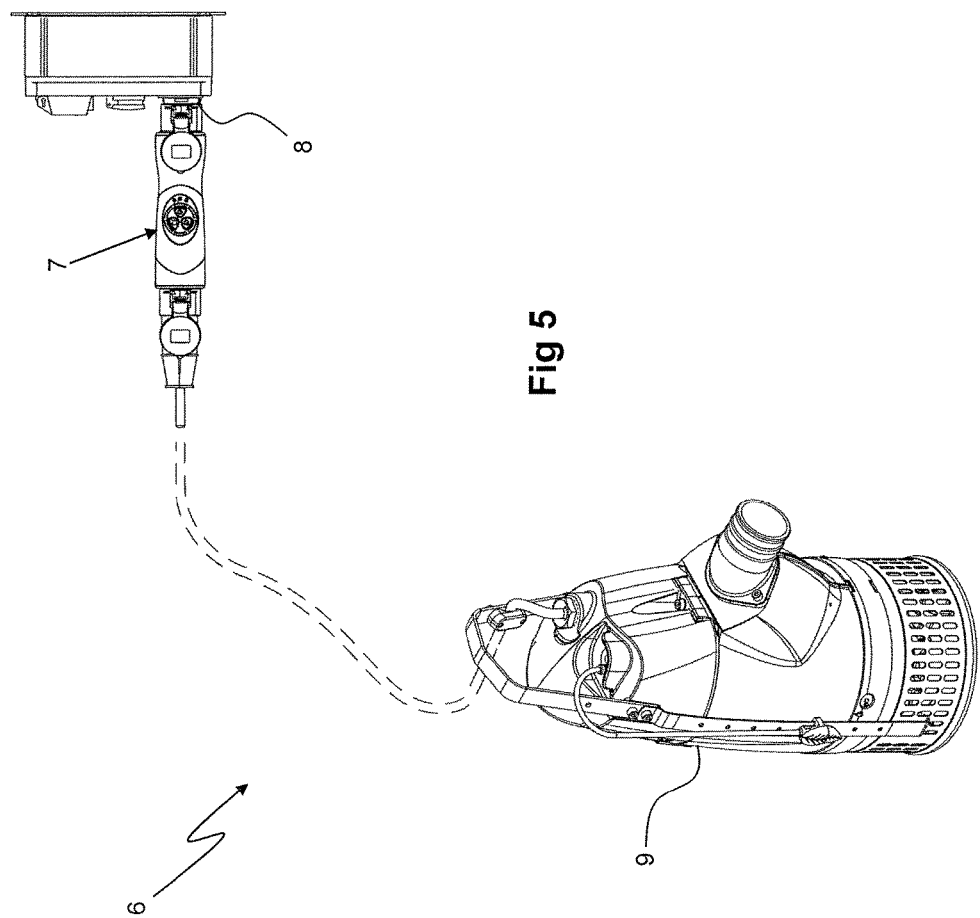
FIG. 5 shows an alternative way to connect the system according to the invention directly to a power outlet.

FIG. 5 shows an alternative way to connect the pump 9 and the system 6 according to the invention to a power outlet 8. In this case the control unit 7 is connected directly to the power outlet 8, without a separate power cable between.

Figure 6:
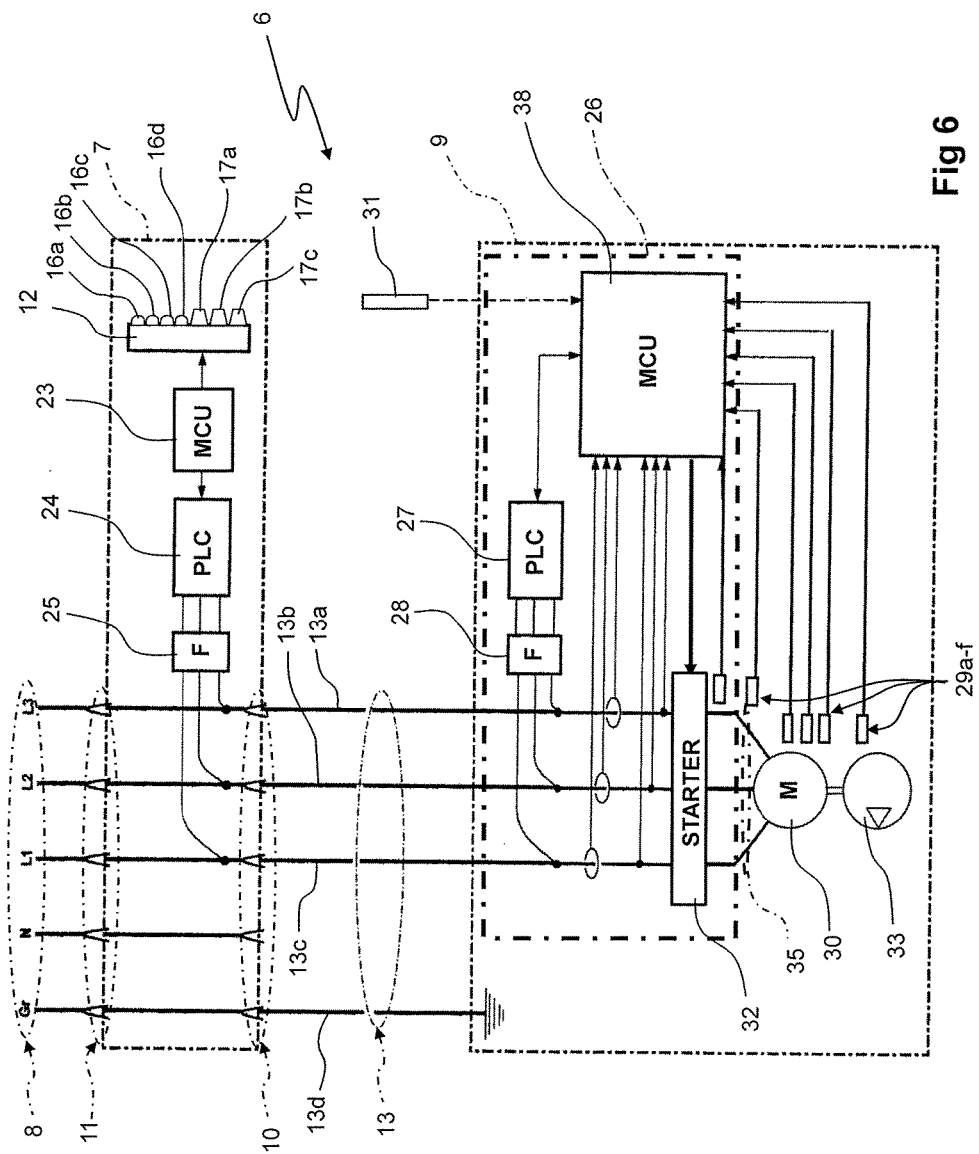
FIG. 6 shows a block diagram illustrating the electrical and electronic circuitry according to the invention.

FIG. 6 shows a block diagram illustrating the system 6 according to the invention. An electronic control unit 7 is connected between a power supply 8 and a pump 9 with its internal electronic equipment, such as an electronic controller 26. The electronic control unit 7 includes the operating panel 12, a microcontroller unit (MCU) 23, a programmable logic controller (PLC) 24 and a filter 25 and is used for communication of signals to the power line cable. The electronic control unit 7 also comprises a number of indicating means 16a-d, such as light emitting diods, that indicate flashing alarm warnings, high current or high motor temperature, phase failure or phase unbalance and warnings. Operating switches 17a-c are arranged for starting and stopping the pump 9 and for initiating an energy save mode etc.

The MCU 23 in the control unit 7 controls all signals and information in the unit and the indicators and operating switches and sends/receives signals to and from the PLC 24. The PLC 24 is connected to the power lines via a first filter 25. All signals are transmitted via the power cable 13 to and from the pump 9 and the pump 9 includes in turn several functions and electronic internal units.

The power cable 13 comprises in this case four cores 13a-d, three phase wires 13a-c and one ground wire 13d, which are standard when using submersible pumps 9. The length of the power cable 13 could typically be about 20 meter, but could of course be both shorter and longer. Power line communication will work with a cable length of up to at least 100 meter. The cable could be extended with standard extension cables (not shown).

The signals transfered via the power cable 13 are received and detected in the pump 9 via the electronic controller 26 including an MCU 38 and a PLC 27 connected to a second filter 28. In the pump 9 also several sensors 29a-f are arranged that detect the motor's 30 temperature and moisture as well as the temperature in the different windings of the motor 30. A sensor 29f is also arranged for detecting water in oil. Optional is a level sensor 31 connected to the MCU 38 for the external water level. The MCU 38 constantly or regularly measures the current in each phase of the motor 30 as well as the voltage in each phase. The MCU 38 controls a direct or soft starter unit 32 arranged to start the pump motor 30 in a correct manner when receiving a start signal from the MCU 38. The motor 30 is connected to a pump wheel 33. The motor 30 comprises an inlet 36 for incoming fluid and a discharge outlet 37 for outgoing fluid.

FIG. 7 shows a pump 9 according to the invention where the interior is partly exposed. Inside the top cap 34 of the pump 9 the electronic controller 26 is arranged comprising the electronics necessary for operating the electrical motor 30 to drive the pump 9, such as for example starting equipment and/or electronics for monitoring at least one of the pump's operating conditions. The power cable 13 is connected to this electronic controller 26 and all transferred signals are received and transmitted via this power cable 13.

FIG. 8 shows the electronic controller 26 in more detail as well as the incoming power cable 13 as well as the cable 35 for transferring current to the motor 30.

Reference signs mentioned in the claims should not be seen as limiting the extent of the matter protected by the claims, and their sole function is to make claims easier to understand. And as will be realised, the invention is capable of modification in various obvious respects, all without departing from the scope of the appended claims. Accordingly, the drawings and the description thereto are to be regarded as illustrative in nature, and not restrictive.

The invention claimed is:

1. A system for controlling a pump, comprising a pump and a control unit connected to the pump by a three phase electrical power supply cable, wherein:

the control unit is, irrespective of a power rating of the pump, detachably connectable to the pump via the electrical power supply cable, the control unit is compatible with pumps having different power ratings, an electronic controller is arranged in the pump, the electronic controller including a soft starter unit for starting the pump and a microcontroller unit for monitoring at least one of the pump's operating conditions, the pump and the control unit are adapted to communicate with each other and transmit data/signals over the electrical power supply cable, comprising control and/or monitoring information/data for managing the system, the pump and the control unit pair automatically such that the control unit receives signals or transmits signals adapted to a specific power rating of the pump paired to the control unit, the control unit is connected to the electronic controller of the pump and located along the electrical power supply cable between a power supply and the pump, and the pump is maintained operational by the electronic controller arranged in the pump when the control unit is bypassed.

2. The system according to claim 1, wherein internal cables are arranged within the control unit in order to allow power supply of the pump to pass through the control unit.

3. The system according to claim 1, wherein the control unit is adapted to automatically detect at least one characteristic of the connected pump, and to adjust the data/signals so that a different connected pump with a different characteristic can be automatically controlled by the same control unit.

4. The system according to claim 1, wherein the system is arranged to provide communication between the pump and the control unit via galvanic connection to the electrical power supply cable.

5. The system according to claim 1, wherein the data between the pump and the control unit are transmitted via signals that are superimposed on one or more conductors in the electrical power supply cable.

6. The system according to claim 1, wherein:
the pump includes a plurality of sensors; and the control unit is adapted to generate and transmit the data/signals to the pump based on sensor signals from the plurality of sensors.

7. The system according to claim 1, wherein the control unit is adapted to generate and transmit the data/signals to the pump by a user operating actuating means of the control unit.

8. A pump having an electrical motor and a mechanical pump wheel, comprising an inlet for incoming fluid and a discharge outlet for outgoing fluid, wherein an electronic controller is arranged in the pump for controlling at least one of the pump's functions and/or monitoring at least one of the pump's operating conditions, and that a direct or soft starter unit necessary for starting the electrical motor to drive the mechanical pump wheel is arranged in the pump, communication between the pump and an external control unit is made via a three phase power supply cable, the external control unit is connected to the electronic controller of the pump and located along the power supply cable between a power supply and the pump, the external control unit is compatible with multiple pumps with different power ratings, the pump and the external control unit pair automatically such that the external control unit receives signals or transmits signals adapted to a specific power rating of the pump paired to the control unit, and the pump is maintained operational by the electronic controller arranged in the pump when the control unit is bypassed.

9. The pump according to claim 8, wherein:

the pump includes a plurality of sensors; and a microcontroller unit (MCU) is adapted in the pump to generate and transmit data signals to the external control unit based on sensor signals from the plurality of sensors.

10. An electronic control unit for controlling and monitoring of a pump, wherein:

the electronic control unit is adapted to be detachably connectable to the pump and to a power supply for providing current to the pump, the electronic control unit is compatible with multiple pumps with different power ratings, communication between the pump and the electronic control unit is made via a three phase power supply cable, the electronic control unit is detachably connectable to an internal electronic controller of the pump and located along the power supply cable between the power supply and the pump, the internal electronic controller of the pump includes a soft starter unit for starting the pump and a microcontroller unit for monitoring at least one of the pump's operating conditions, the electronic control unit is provided with at least one operating switch for controlling the pump as well as with indicators for indicating at least one operating condition of the pump, a communications unit is arranged in the electronic control unit to receive data from the pump and for transmitting control commands to the pump over the power supply cable, the pump and the electronic control unit pair automatically such that the electronic control unit receives signals or transmits signals adapted to a specific power rating of the pump paired to the control unit, and the pump is maintained operational by the electronic controller arranged in the pump when the control unit is bypassed.

11. The electronic control unit according to claim 10, wherein the communications unit is arranged to receive data from the pump and to transmit control commands to the pump via signals transmitted by one or more wires within the power supply cable.

12. The electronic control unit according to claim 10, wherein a circuit board is arranged to superimpose the signals over a normal frequency of drive current in the power supply cable.

13. The electronic control unit according to claim 10, wherein the communications unit is galvanically connected to one or more wires in the power supply cable located between the electronic control unit and the pump.

14. The electronic control unit according to claim 10, wherein electrical plug connectors are arranged at opposite end areas of the electronic control unit.

* * * * *